Dec. 26, 1961   J. F. PUETZ   3,014,565
MOUNTING ASSEMBLY
Filed May 4, 1959
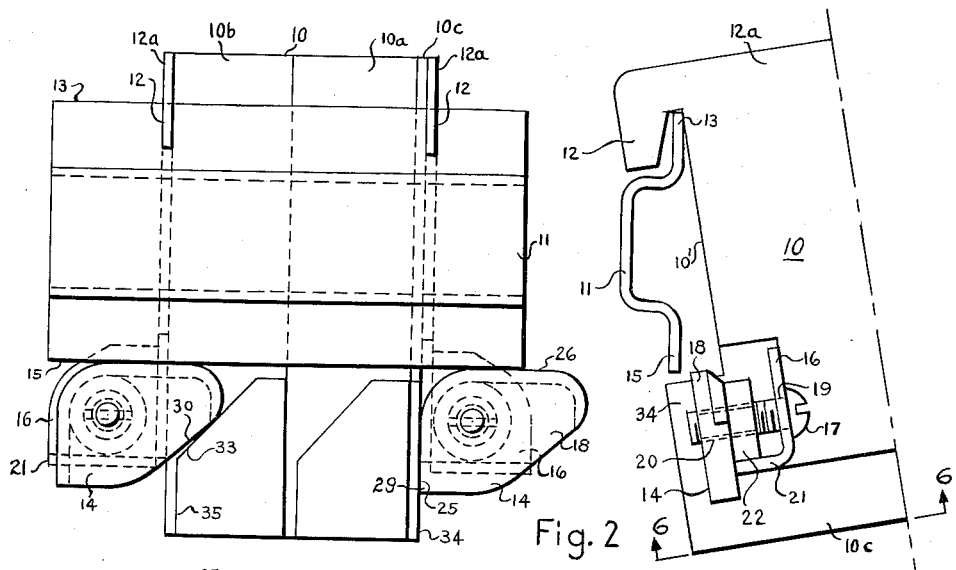
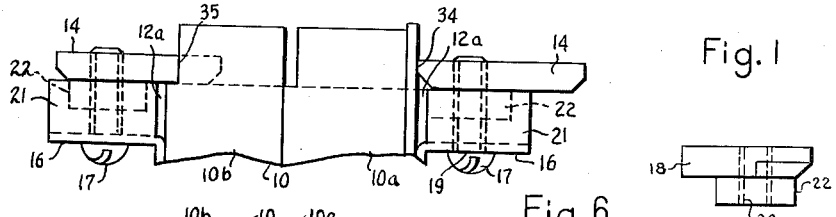
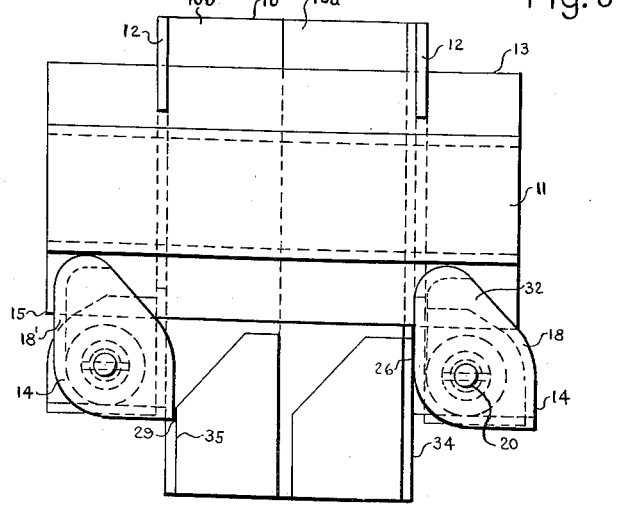
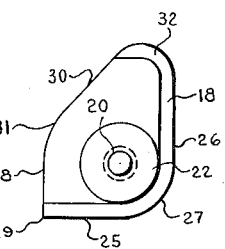
INVENTOR.
JORDAN F. PUETZ
BY
Clyde H. Haynes
his atty.

United States Patent Office 3,014,565
Patented Dec. 26, 1961

3,014,565
MOUNTING ASSEMBLY
Jordan F. Puetz, Milwaukee, Wis., assignor to Square D Company, Detroit, Mich., a corporation of Michigan
Filed May 4, 1959, Ser. No. 810,929
4 Claims. (Cl. 189—88)

The present invention relates to a mounting and in particular to a mounting for releasably attaching an electrical component to a supporting member.

Electrical components are usually mounted on supporting members, for example, channel shaped members. When many of these electrical components are to be attached to one or more supporting members, much time is saved if the electrical components can be hooked over one edge of the supporting member and then clamped to the other edge of the member to secure it tightly to the supporting member. In many instances it is not known at the time of fastening the electrical component to the supporting member exactly where it should be positioned along the member. Prior to the present invention various methods and devices have been used for fastening electrical components to the members, for example, screwing and bolting; however, problems arose through the need for drilling holes, reaching nuts behind the supporting member, mislocating holes, or relocating the electrical components at the job site. Handling small nuts and bolts, and drilling holes for securing small electrical components on supports during construction, is time consuming and difficult.

One of the main objects of the present invention is to overcome these problems and others by providing a mounting which may be quickly and easily installed with use of only a single common tool.

Another object of the present invention is to provide an electrical component with a mounting which hooks over one edge of a supporting member and has clamp means which engage the opposite edge of the supporting member.

Another object of the invention is to make the clamp means from a nylon, or other similar plastic material, cam nut and a screw threaded therein.

A further object of the invention is to provide an electrical component with a cam and a bolt engaging the cam in such manner that the cam automatically falls into a position wherein it does not interfere with placing the component against its supporting member and wherein turning of the bolt moves the cam into a holding position, and tightening of the bolt tightens the cam against the supporting member to securely attach the electrical component to its supporting member.

Other objects and a fuller understanding of this invention may be had by referring to the following description and claims, taken in conjunction with the accompanying drawings in which:

FIGURE 1 is an end view of an electrical component partially assembled on to a supporting member to illustrate the features of the present invention.

FIGURE 2 is a back view of the structure of FIGURE 1.

FIGURE 3 is a back view similar to FIGURE 2 and showing the cam nuts securing the electrical component to the supporting member.

FIGURE 4 is an edge view of the cam nut.

FIGURE 5 is a front view of the cam nut of FIGURE 4; and

FIGURE 6 is a plan view taken in the direction of arrow 6—6 in FIGURE 1.

The description, drawings, and claims jointly set forth one or more embodiments of the present invention, and the present contribution to the art of mounting electrical components on supporting members.

As illustrated in the drawings for purposes of exemplification, and not of limitation, an electrical component 10, having a back 10', is to be mounted on a supporting member 11 which, in this instance is commonly referred to as a channel because of its channel shape. The electrical component 10 may be formed of a plurality of individual identical blocks of insulating material, i.e., 10a and 10b, which are arranged side by side in a row. One end of the row of blocks is insulated from the metal plates 12a on which the hooks 2 and wings 16 are formed by an insulating sheet 10c. The blocks 10a and 10b and the insulating sheet 10c are sandwiched between the metal plates 12a as shown in FIGURE 1. The metal plates 12a are provided with one or more hooks 12 adapted to hook over on edge 13 of channel 11 and is also provided with one or more suitable camming structures 14 adapted to engage another edge 15 of channel 11 to secure the electrical component 10 to channel 11. Since all camming structures are similar, only one will be described in detail. Camming structure 14 comprises a wing 16, formed in metal sheet 12a, a bolt 17, and a cam nut 18.

Wing 16 extends outwardly from the metal sheet 12a of the electrical component 10 and as disposed in a plane substantially parallel to the plane of the back of electrical component 10, and thus parallel to the plane of supporting member or channel 11 after electrical component 10 is secured to channel 11. Wing 16 is provided with a bolt receiving opening 19 through which bolt 17 loosely extends with the axis of bolt 17 being disposed transverse to wing 16.

Cam nut 18 is constructed of nylon or other similar materials which will have a gripping action on bolt 17 so that rotation of bolt 17 will cause rotation of cam nut 18 therewith. As illustrated, cam nut 18 is provided with a threaded opening 20 which receives bolt 17 so that rotation of bolt 17 in one direction causes axial movement of cam nut 18 towards wing 16 and so that rotation of bolt 17 in the opposite direction causes axial movement of cam nut 18 away from wing 16. Naturally when cam nut 18 is drawn towards wing 16, and edge 15 is disposed therebetween, cam nut 18 will clamp edge 15 between cam nut 18 and the back 10' of electrical component 10 to secure electrical component 10 to supporting member or channel 11.

It has been found that the present structure is very convenient to use if wing 16 and cam nut 18, as well as the back 10' of electrical component 10, are constructed in a manner to be described. The convenient operation wherein component 10 may be secured to channel 11 with use of only a single tool, such as a screw driver, is obtained by providing wing 16 with a flange 21 and providing cam nut 18 with a cylindrical body portion 22 which engages flange 21 and which extends around threaded opening 20 on the side of cam nut 18 which is next to wing 16.

As best illustrated in FIGURES 4 and 5 cam nut 18 has edges 25 and 26 disposed at right angles to each other and intermerged at a rounded corner 27, the circumference of which has its center at the center of the threaded opening 20. Extending generally parallel with edge 26 is an opposite edge 28 which meets edge 25 at a sharp corner 29. The boundary of cam nut 18 is completed by an edge 30 which extends at an angle to and meets opposite edges 28 and 26 in rounded corners 31 and 32, respectively. It is particularly noted that rounded corner 32 is further disposed from threaded opening 20 than sharp corner 29 and rounded corner 27, so that the center of weight, or the center of a cross dimension between rounded corner 32 and edge 25, of cam nut 18 is located between threaded opening 20 and rounded corner 32 and not at the center of opening 20. In this way, when bolt 17 is turned in one direction cam nut 18 will tend to turn therewith and cause rounded corner 32 to assume a position wherein the component 10 can be released from the channel 11 as illustrated in FIGURE 2 wherein the edges 26 of the respective cam nuts shown on the left and right hand cam nuts on component 10 are entirely free of edge 15. The cam nuts are limited in their movement to the release position as when the edge 30 of the left cam nut in FIG. 2 engages a shoulder 33 on the component 10b and the edge 25 of the cam nut on the right side of the component 10 in FIG. 2 engages a surface 34 of the insulating member 10c.

When electrical component 10 is to be installed on supporting member 11, hook 12 is hooked over edge 13 and electrical component 10 is pressed against supporting member 11. Thereafter bolt 17 is rotated to draw cam nut 18 towards wing 16. Upon rotation of bolt 17 the friction between bolt 17 and cam nut 18, and more specifically between the threads on bolt 17 and the threads in threaded opening 20, cause cam nut 18 to rotate with bolt 17. As illustrated on the left hand side in FIGURE 3, cam nut 18' rotates until sharp corner 29 engages abutment 35 which is integrally formed on block 10 to extend below edge 15 of the channel 11, and as illustrated on the right hand side cam nut 18 rotates until edge 26 engages the flat face 34 of the insulating sheet 10c which similarly extends below edge 15. This puts rounded corner 32 in a position overlapping edge 15 so that further turning of bolt 17 draws rounded corner 32 towards wing 16 to clamp the electrical component 10 onto edge 15 of supporting member 11. Edges 25 and 26 and corners 27 and 32 may also be chamfered, as illustrated, on the side of cam nut 18 from which body portion 22 extends to facilitate movement of corner 32 over edge 15.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a clamping arrangement for securing an electrical component to a support, the combination comprising; a channel having a U-shaped cross section with a pair of outwardly extending oppositely facing flanges, a pair of spaced hooks on the component disposed to embrace one of the flanges, and clamp means on the component arranged to engage the other of the flanges, said clamp means including: an ear on the component having a main portion having an opening therein and disposed in a plane parallel to and spaced from the other flange, a portion depending from the main portion and spaced from the opening and disposed in a plane perpendicular to and spaced from the other flange, a rotatable clamping element formed of a molded material to have a threaded opening aligned with the opening in the main portion, an annular abutment surrounding the threaded opening arranged to slidingly abut the depending portion during rotation of the clamping element, a clamping portion arranged on the periphery of clamping element having a surface to be engageable with the other flange when the element is rotated in one direction to a predetermined position and for releasing the other flange when the clamping element is rotated in the opposite direction to a second predetermined position, a right angled portion on the periphery of the clamping element for limiting the rotation of the clamping element to at least one of said predetermined positions and a screw having a head portion engageable with the surface of the main portion opposite to the depending portion and a threaded shank portion loosely received in the opening in the main portion and threadably received in the threaded opening for rotating the clamping element to either of said predetermined positions.

2. The combination as recited in claim 1 wherein the peripheral edges of the clamping portion are chamfered to facilitate the engagement and release of the clamping portion with the other flange.

3. The combination as recited in claim 1 wherein the clamping portion engages a portion of the component when the element is rotated to one of the predetermined positions and the right angled portion engages a portion of the component when the element is rotated to the other of the predetermined positions.

4. The combination as recited in claim 1 wherein the clamping element is formed of molded nylon and the center of gravity of the element is offset from the threaded opening.

References Cited in the file of this patent

UNITED STATES PATENTS

| | | |
|---|---|---|
| 1,105,284 | McMurtrie | July 28, 1914 |
| 2,896,295 | Fischer | July 28, 1959 |
| 2,930,459 | Moser | Mar. 29, 1960 |